March 1, 1949.  S. M. PARKER  2,462,992
CENTERING MECHANISM FOR AIRCRAFT WHEEL MOUNTINGS
HAVING CASTORING OR EQUIVALENT MOTION
Filed Feb. 4, 1946  2 Sheets-Sheet 1

INVENTOR.
SYDNEY M. PARKER
BY
T. J. Plante
ATTORNEY

March 1, 1949.

S. M. PARKER 2,462,992

CENTERING MECHANISM FOR AIRCRAFT WHEEL MOUNTINGS
HAVING CASTORING OR EQUIVALENT MOTION

Filed Feb. 4, 1946

INVENTOR.
SYDNEY M. PARKER
BY
T. J. Plante
ATTORNEY

Patented Mar. 1, 1949

2,462,992

UNITED STATES PATENT OFFICE 2,462,992

CENTERING MECHANISM FOR AIRCRAFT WHEEL MOUNTINGS HAVING CASTORING OR EQUIVALENT MOTION

Sydney Macdonald Parker, Leamington Spa, England, assignor to Automotive Products Company Limited, Leamington Spa, England Application February 4, 1946, Serial No. 645,380
In Great Britain October 24, 1944

Section 1, Public Law 690, August 8, 1946
Patent expires October 24, 1964

8 Claims. (Cl. 244—102)

This invention relates to centering mechanism for aircraft wheel mountings having castoring or equivalent motion, and more particularly, to such mountings which are retractable by fluid pressure means into a housing in the aircraft, the object of the invention being to ensure that the mounting takes up, during retraction, a position with the wheel lying in a plane parallel to the longitudinal axis of the aircraft, so that it does not foul any part of the aircraft structure but enters correctly into the housing.

In an aircraft wheel mounting having a wheel-carrying member mounted for angular swivelling movement in or on a supporting member, which latter is mounted upon the aircraft for movement to and from a retracted position and is provided with retracting means, said mounting incorporating centering mechanism adapted to urge the wheel-carrying member to a predetermined angular position relative to the supporting member, the invention is characterised by the fact that the centering mechanism and the retracting mechanism are operated by the same supply of pressure fluid so that the wheel-carrying member is urged towards and held in its said predetermined position by the said pressure fluid as the supporting member is retracted.

There is further provided according to the invention an aircraft wheel mounting having a wheel-carrying member mounted for angular swivelling movement in or on a supporting member, which latter is mounted upon the aircraft for movement to and from a retracted position and is provided with retracting means, said mounting incorporating centering mechanism adapted to urge the wheel-carrying member to a predetermined angular position relative to the supporting member, characterised by the fact that the retracting means and the centering mechanism are both operated by pressure fluid, a common control device being provided for delivering pressure fluid to the centering mechanism and the retracting means.

The centering mechanism can conveniently include a spring device which constantly urges the wheel-supporting member to the said predetermined position. Preferably the centering mechanism comprises a cylinder disposed co-axially with the swivelling axis and adapted to be fed with pressure fluid from an external source, a plunger slidable in the cylinder, and a cam device which, as the wheel-carrying member moves from its predetermined position, causes the plunger to be advanced within the cylinder. The cylinder of the centering mechanism may constitute within the supporting member a fixed stem around which the wheel-carrying member is mounted with freedom to swivel, the cylinder, if desired, being slotted longitudinally for the slidable reception of a diametral pin which passes through the plunger and engages at its ends with a cam follower engaging a cam surface upon the wheel-carrying member so that axial movement of the plunger due to fluid pressure within the cylinder causes the wheel-carrying member to be moved to the said predetermined position.

The supporting member usually comprises a cylindrical casing which is pivotally mounted upon the aircraft for retracting movement and which contains a cylindrical unit constituting the upper part of the wheel-carrying member, said unit containing in its upper portion the centering mechanism and in its lower portion a telescopic shock-absorbing suspension device for transmitting the load to the wheel. If desired the centering mechanism may include a valve which controls the supply of pressure fluid to the retracting means so as to prevent the supporting member from being retracted when the wheel-carrying member is displaced substantially from the said predetermined position; this effect may be achieved by causing the plunger to co-operate with one or more ports in the cylinder to form the valve controlling the supply of pressure fluid to the retracting means.

The invention is illustrated by way of example in the accompanying diagrammatic drawings in which.

Figures 1, 3:
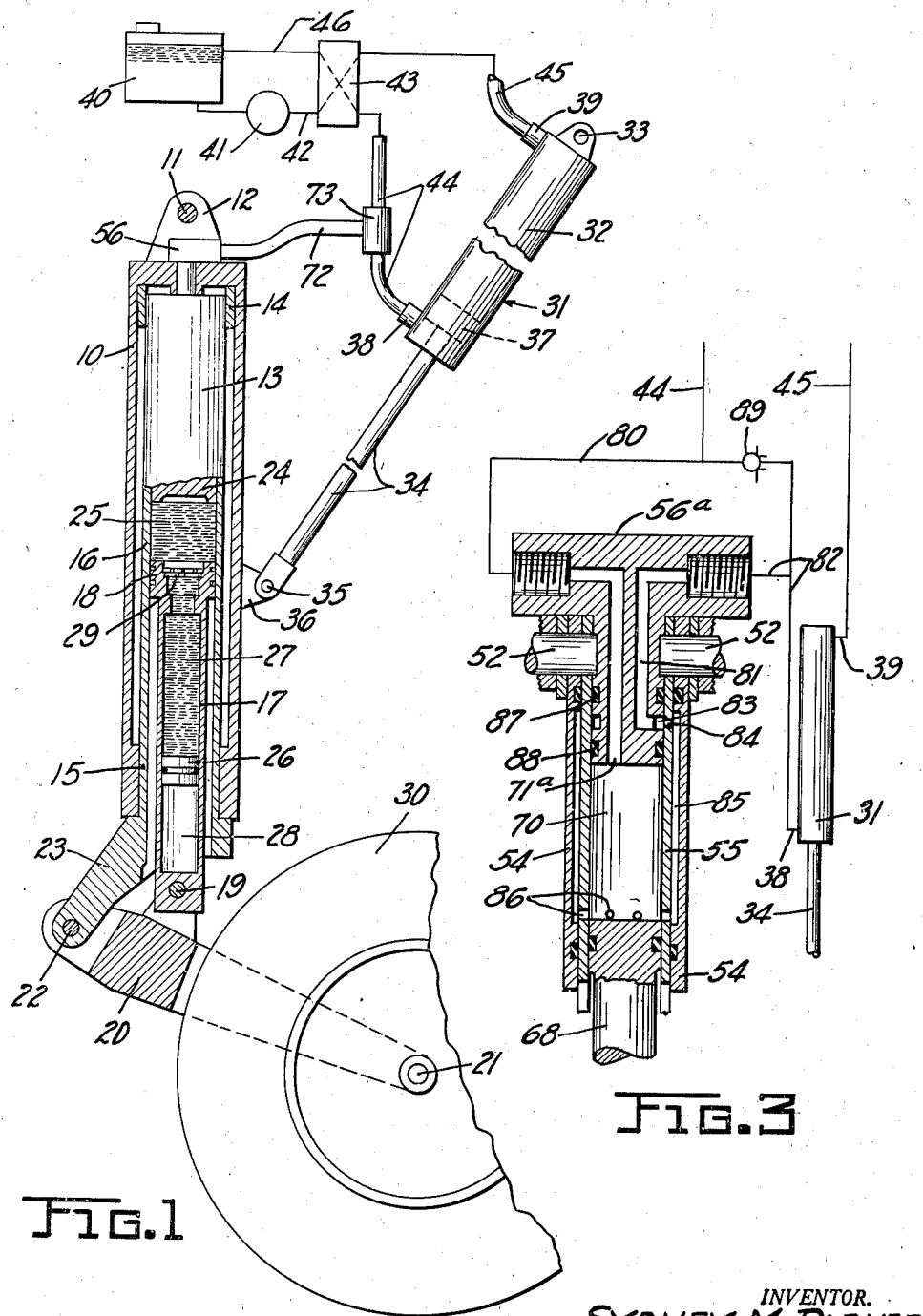
Figure 1 is a part sectional side elevation of a typical wheel mounting, say the tail wheel of an aircraft.
Figure 3 is a fragmentary view of a modified form of hydraulic cylinder and plunger adapted for use with the centering mechanism shown in Figure 2.

The wheel mounting shown in Figure 1 comprises a supporting member 10 in the form of a hollow cylindrical casing which is pivotally attached to the fuselage of an aircraft (not shown) by means of a pivot pin 11 extending between a pair of lugs formed upon the upper end of the supporting member 10, one of said lugs being shown at 12. A wheel-carrying member indicated generally at 13 is also substantially cylindrical in shape and extends upwardly within the supporting member 10, said wheel-carrying member 13 being rotatable about its axis for which purpose it is pivotally mounted at its upper end in a bearing bush 14 while its lower part is rotatable within a bearing 15 provided within the lower end of the supporting member 10.

The wheel-carrying member 13 comprises a tubular shell 16 arranged to serve as a cylinder of an oleo-pneumatic shock-absorbing suspension device, this device being of the known form and comprising a tubular plunger 17 having at its upper end a piston head 18 which is shaped to slide and rock within the cylinder tube 16, the lower end of said plunger member 17 being pivoted at 19 to a forked arm 20 which carries a wheel axle 21 at one end and is pivotally attached at its other end by a pin 22 to a bracket 23 formed upon the lower end of the wheel-carrying member 13. A closure plug 24 within the tube 16 forms the upper boundary of a cylinder working space 25 which is filled with damping liquid such as oil while the plunger 17 has its interior divided into two working spaces by a floating piston 26, the upper working space 27 being filled with liquid while the lower working space 28 is charged with air or other gas under pressure. The piston head 18 is fitted with a damping valve device 29 adapted to control the flow of damping liquid through the piston head 18 as the wheel 30 mounted upon the axle 21 rises and falls during taxying.

The supporting member 10 is arranged to be retracted by a hydraulic jack device 31 which also serves in the known manner as a stay or strut when the wheel 30 is in operation. The jack device 31 is double acting, the cylinder 32 being pivotally attached to the aircraft fuselage by a pin 33 while the lower end of its piston rod 34 is attached pivotally at 35 to a lug 36 projecting from the supporting member 10. The piston of the jack device is shown in dotted lines at 37 while the pressure inlet for retraction is shown at 38 and the pressure inlet for "extension" of the wheel mounting is shown at 39. The hydraulic system for operating the wheel mounting is indicated diagrammatically and comprises a reservoir 40 which feeds a pump 41, the delivery pipe 42 of which leads to a reversing valve device 43; this enables pressure liquid from the pump 41 to be fed to either one of a pair of flow and return pipe lines 44 and 45 leading respectively to the connections 38 and 39, the other of said pipe lines being in free communication with the reservoir 40 by way of a pipe 46. Thus when pressure liquid is fed to the pipe 44 the piston 37 is forced upwardly within the cylinder 32, the piston rod 34 drawing the wheel mounting angularly upwards about the pin 11 until the mounting reaches its fully retracted position, where it is usually accommodated within a relatively close fitting recess (not shown) in the aircraft fuselage. On the other hand the mounting is "extended" to its operative position by feeding pressure liquid through the pipe 45 so as to force the piston 37 to the lower end of its stroke. Owing to the arrangement of the fork member 20 and the fact that the wheel carrying member 13 is free to rotate within the supporting member 10, the wheel 30 has a castoring action which is utilised when the aircraft is being manoeuvred on the ground; on account of this freedom to castor however it is desirable, and possibly essential, that the wheel 30 should be brought into a predetermined radial plane relative to the pivotal axis of the wheel carrying member 13 before retraction is completed so that the wheel 30 and the fork member 20 will move smoothly into the recess in the fuselage. This action is obtained owing to the provision of centering mechanism which is disposed in the upper part of the wheel carrying member 13, said centering mechanism being arranged to bring the wheel 30 diametrically into the position shown in Figure 1 before or during retraction.

Figure 2:
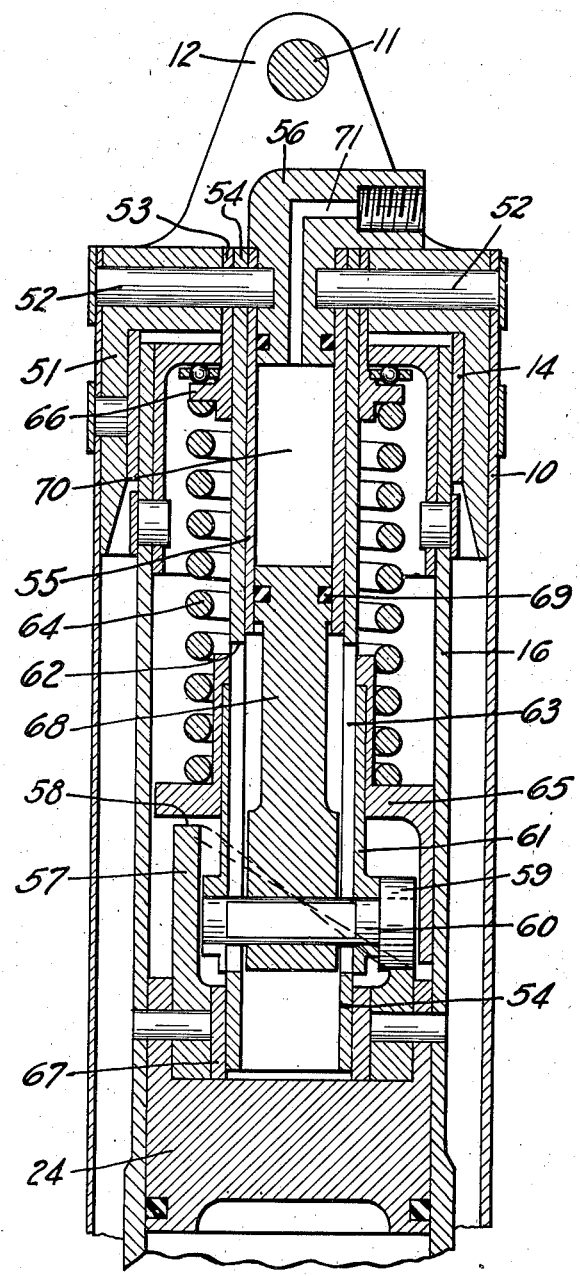
Figure 2 is a fragmentary sectional elevation of the upper part of the wheel-supporting member drawn to an enlarged scale and showing the general arrangement of the centering mechanism.

The internal construction of the centering mechanism is shown in Figure 2. The lugs 12 are formed upon a cup-shaped plug 51 which latter carries the bearing bush 14 and is located in position by radial dowels 52; these also serve to hold in position several concentric portions of the centering mechanism, namely a thrust bush 53, a tubular stem 54, a cylinder liner 55 and a right angled connection plug 56, these all being coaxial with the supporting member 10 and being attached rigidly thereto.

The upper part of the plug 24 within the tube 16 is recessed for the accommodation of a tubular cam member 57 which latter has an oblique cam surface 58 facing upwardly in the axial direction and arranged to be engaged by a roller 59 constituting a cam follower; this roller is mounted upon one end of a diametral pin 60 which latter is fitted into the lower end of a follower sleeve 61 and is arranged to extend slidably through longitudinal slots 62 and 63 formed in the stem 54 so as to allow the roller 59 to rise and fall as the cam member 57 rotates about its axis. The said roller 59 is however urged downwardly by a coiled compression spring 64, the lower end of which engages a flange member 65 mounted upon the sleeve member 61 while the upper end of said spring 64 bears against a flange 66 extending outwards from the lower part of the thrust bush 53. A bearing bush 67 fitted into the lower part of the cam member 57 serves as a rotatable support for the lower end of the tubular stem 54. As the circumferential cam track 58 conforms approximately to a plane which is perpendicular to the plane of Figure 2 but is oblique with respect to the axis of rotation, it follows that the roller 59 is shown in its lowermost position so that angular movement of the cam member 57 in either direction will cause the roller 59 to rise against the force exerted by the spring 64; conversely the spring 64 always acts to move the roller 59 to its lowest position thus tending to turn the cam member 57 (and consequently the tube 16 and the wheel 30 carried thereby) to the predetermined position shown in Figures 1 and 2. This movement of the wheel 30 to a predetermined position or "centering" as it is termed in the present specification is also brought about by hydraulic pressure and for this purpose a plunger 68 is disposed within the tubular stem 54 and has its lower end attached to the pin 60. The upper part of the plunger 68 slides in a pressure-tight manner within the cylinder liner 55, a packing ring 69 being provided. The interior of the cylinder liner 55 thus constitutes a working space 70 which is in permanent communication with the connection 38 of the jack device 31 by way of a passage 71 in the connection plug 56, a flexible pipe 72 and a T-piece 73 in the pipe 44 (see Figure 1). Whenever pressure liquid is fed through the pipe 44 to retract the wheel 30 by means of the jack unit 31, said pressure liquid simultaneously flows through the pipe 72 to the working space 70 of the centering mechanism and consequently presses the plunger 68 downwards so as to augment the action of the spring 64 in bringing the wheel 30 to its predetermined or centred position in readiness for entering its housing within the fuselage. It will be seen therefore that the centering effect of the spring 64 can be arranged to be exactly that which is required to produce the smoothest running on the ground, for any increased force which is required to bring the wheel to its centred position for retraction is supplied by the hydraulic pressure within the working space 70.

It may be desirable in some cases to ensure that the wheel is in its centred position before any retraction takes place and this result can readily be achieved by modifying the centering mechanism in the manner shown in Figure 3. In this instance, the pressure liquid for retraction is fed initially to the centering device which latter incorporates a valve arranged to open when the wheel has been centred, thus diverting said pressure liquid to the jack device indicated at 31. The flow and return pipe 44 leads by a connection 80 to a substantially T-shaped connection plug 56a fitted into the upper end of the cylinder liner 55, a passage 76 placing the connection 80 into permanent communication with the working space 70. The connection plug 56a also has an outlet passage 81 leading by way of a pipe 82 to that connection 38 of the jack device 31 which is fed with pressure liquid to bring about retraction. The lower end of the passage 81 leads into a circumferential groove 83 in the plug 56a and thence by way of one or more radial passages 84 in the cylinder liner 55 into an annular chamber 85 between the tubular stem and said cylinder liner 55. The lower part of the annular chamber 85 communicates with ports 86 which are just uncovered by the plunger 68 as the latter reaches the lowermost position. In this instance the connection plug 56a is provided with a pair of packing rings 87 and 88 to prevent leakage of pressure liquid between the plug 56a and the cylinder liner 55. The connection 39 of the jack device 31 is joined as before, directly with the reversible control valve 43 by a pipe 45. A non-return valve 89 is connected between the pipes 80 and 82 so as to by-pass the working space 70 when the wheel mounting is being extended, thus enabling liquid rejected from the connection 38 of the jack device to flow freely through the non-return valve 89, back to the reservoir 40.

The operation of the device shown in Figure 3 is as follows. When it is desired to retract the wheel 30, pressure liquid is fed to the pipe 44, and as it cannot flow past the valve 89 it passes through the passage 71a into the working space 70 of the centering device. If the wheel 30 is not already in its centred position, the plunger 68 will be raised by the cam member 57, so that the liquid pressure, acting within the working space 70, will force the plunger 68 downwards and thus move the wheel to its predetermined centred position. As this position is reached and the plunger arrives at its lowermost position, the ports 86 are uncovered so that pressure liquid from the working space 70 can then flow through the annular chamber 85 and passage 81 to the connection 38 of the jack device 31 to bring about retraction of the wheel 30. During extension of the wheel mounting, when pressure liquid is fed to the jack connection 39, the valve 89 enables the rejected liquid to escape from the connection 38, even though the wheel 30 may be moved, say by a side wind, to a position in which the plunger 68 is raised and closes off the ports 86.

It will be understood that the centering mechanism may be modified in various ways without departing from the scope of the invention, and that it may be applied to mountings other than that described. For example, it may be applied to mountings which do not in themselves incorporate shock absorbing means, but are so mounted as to be permitted bodily movement relative to the aircraft under the control of separate shock absorbing means.

What I claim is:

1. An aircraft wheel mounting comprising a supporting member, a wheel-carrying member mounted for angular movement about the supporting member, a pivotal mounting connecting the supporting member to the aircraft so that it can swing in a plane from its extended position to a retracted position, a first fluid pressure motor to move the supporting member to and from its retracted position, centering mechanism which urges the wheel-carrying member to a position in which the wheel lies in the plane of retraction, a second fluid pressure motor operating the centering mechanism, and a single control valve arranged to supply pressure fluid from a common source to the said first and second fluid pressure motors.

2. An aircraft wheel mounting as claimed in claim 1, wherein the centering mechanism includes a spring device constantly urging the wheel-carrying member to the said position in which the wheel lies in the plane of retraction.

3. An aircraft wheel mounting as claimed in claim 1, wherein the second fluid pressure motor comprises a cylinder disposed coaxially with the swiveling axis and a plunger slidable in the cylinder, and wherein the centering mechanism comprises a cam device which, as the wheel-carrying member moves from the said position in which the wheel lies in the plane of retraction, causes the plunger to be advanced within the cylinder.

4. An aircraft wheel mounting as claimed in claim 1, wherein the second fluid pressure motor comprises a cylinder disposed coaxially with the swiveling axis and a plunger slidable in the cylinder, wherein the centering mechanism comprises a cam device which, as the wheel carrying member moves from the said position in which the wheel lies in the plane of retraction, causes the plunger to be advanced within the cylinder, and wherein the cylinder of said second fluid pressure motor constitutes, within the supporting member, a fixed stem around which the wheel-carrying member is mounted with freedom to swivel.

5. An aircraft wheel mounting as claimed in claim 1, wherein the second fluid pressure motor comprises a cylinder disposed coaxially with the swiveling axis and a plunger slidable in the cylinder, the cylinder being slotted longitudinally for the slidable reception of a diametral pin, and wherein the centering mechanism comprises a cam device including a cam surface upon the wheel-carrying member, a cam follower engaging said surface, and a diametral pin which passes through the plunger and through the longitudinally slotted cylinder and which engages at its ends with the cam follower so that axial movement of the plunger due to fluid pressure within the cylinder causes the wheel-carrying member to be moved to the said position in which the wheel lies in the plane of retraction.

6. An aircraft wheel mounting as claimed in claim 1, wherein the supporting member comprises a cylindrical casing which is pivotally mounted upon the aircraft for retracting movement, and wherein the upper part of the wheel-carrying member is a cylindrical unit contained within said cylindrical casing, said cylindrical unit containing in its upper portion the centering mechanism and in its lower portion a telescopic shock absorbing extension device for transmitting the load to the wheel.

7. An aircraft wheel mounting as claimed in claim 1, wherein the centering mechanism includes a valve which controls the supply of pressure fluid to said first fluid pressure motor so as to prevent the supporting member from being retracted when the wheel-carrying member is displaced substantially from the said position in which the wheel lies in the plane of retraction.

8. An aircraft wheel mounting as claimed in claim 7, wherein the second fluid pressure motor comprises a cylinder disposed coaxially with the swiveling axis and a plunger slidable in the cylinder, and wherein the centering mechanism comprises a cam device which, as the wheel carrying member moves to the said position in which the wheel lies in the plane of retraction, causes the plunger to be advanced within the cylinder, said plunger cooperating with one or more ports in the cylinder to form the valve which controls the supply of pressure fluid to said first fluid pressure motor.

SYDNEY MACDONALD PARKER.

REFERENCES CITED

The following references are of record in the file of this patent:

UNITED STATES PATENTS

| Number | Name | Date |
|---|---|---|
| 2,132,682 | Dowty | Oct. 11, 1938 |

FOREIGN PATENTS

| Number | Country | Date |
|---|---|---|
| 464,144 | Great Britain | Apr. 13, 1937 |
| 515,612 | Great Britain | Dec. 11, 1939 |